United States Patent Office 3,007,886
Patented Nov. 7, 1961

3,007,886
SILICON-NITROGEN COMPOSITIONS MODIFIED WITH METALLIC SALTS
Konrad Parker, Park Ridge, Ill., assignor to The Richardson Company, Melrose Park, Ill., a corporation of Ohio
No Drawing. Filed Oct. 15, 1958, Ser. No. 767,291
15 Claims. (Cl. 260—18)

This invention is concerned with certain silicon-nitrogen coating compounds and, more particularly, to such compounds which have been modified with selected metallic salts for the purpose of improving their curing rate and resulting properties.

Broadly, the silicon-nitrogen compounds contemplated by the present invention are those which are formed as a result of the reaction between ammonia or primary amines and a halosilane. Halosilanes may be defined as silicon halides having one or more hydrogen atoms or organic groups and halogen atoms attached directly to the silicon. Such halosilanes have the generic formula:

$$R_nSiHal_{4-n}$$

wherein R is hydrogen or a monovalent organic group attached to the silicon, for example, alkyl, aryl, and similar groups. Processes for making these compounds and the compounds themselves are disclosed in several patents issued to Nicholas D. Cheronis, an example of which is Patent No. 2,579,418.

As indicated in the Cheronis patents, the reaction of a halosilane, having the above generic formula, with an ammonia or primary amine is understood to result in the substitution of an $NH_2$ or NHR amino group for each of the halogen atoms attached to the silicon. The reaction is conducted in the absence of water in order to avoid hydrolysis and normally in the presence of an inert organic solvent. In many instances, it has been found that, simultaneously or immediately subsequent to the ammonolysis or aminolysis of the halosilanes, additional reactions will occur wherein certain of the resultant reaction products undergo self-polymerization, forming either chain-type polymers or cyclic compositions. In fact, in many instances, it is difficult, if not impossible, to isolate the monomer of such reaction products. As indicated in the Cheronis patents, polymerized silamines are characterized by having an

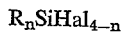
—Si—N—Si— linkage as part of their molecular structure.

In some instances, the ammonolysis or aminolysis reaction products of halosilanes are referred to as "aminosilanes" or "silamines." The term "silamines" will, at times, be used herein in referring to the particular reaction products contemplated.

The halosilanes and their ammonolysis or aminolysis reaction products are also frequently described in terms of their functionality. Functionality is an indication of either the replaceable halogen atoms attached directly to the silicon or the amino groups which have replaced such halogen atoms. Thus, a halosilane having two replaceable halogen atoms attached directly to the silicon would be referred to as being difunctional as would the corresponding ammonolysis or aminolysis reaction products. Likewise, a halosilane having three or four replaceable halogen atoms attached directly to the silicon, as well as the derivative ammonolysis or aminolysis reaction products, would be referred to as being trifunctional or tetrafunctional, respectively. It is possible to have only one replaceable halogen atom attached to the silicon atom, in which event the corresponding amination product would be monofunctional. However, the present invention is only concerned with the ammonolysis of aminolysis reaction products of the di, tri and tetra functional halosilanes.

Further, while a variety of monovalent organic groups may be attached to the silicon atom of the halosilane, the present invention is only concerned with those products having a monovalent alkyl or aryl hydrocarbon group attached to the silicon, illustrative of which are the methyl, ethyl and benzyl radicals and their substituted derivatives. In the difunctional silamines, wherein two hydrocarbon groups are attached to the silicon, the groups may be the same or may be different. Thus, both an ethyl and a methyl or benzyl radical may be attached to the silicon of a difunctional aminosilane. Various primary amines may be used if the silamines are prepared by aminolysis. Typical amines are methylamine, ethylamine, allylamine, aniline and benzylamine and mixtures of such amines.

The usual halosilanes subjected to ammonolysis or aminolysis are the chlorosilanes due to the fact that the latter compounds are more readily available and, also, due to the fact that the hydrogen chloride, formed as a by-product, may be easily removed. In general, the difunctional ammonolysis or aminolysis reaction products of the corresponding chlorosilanes, while apparently susceptible to self-polymerization after formation, have the characteristics of an oily liquid and are thoroughly stable in that they undergo no appreciable change at room temperatures or moderately elevated temperatures. However, many of the trifunctional and tetrafunctional reaction products have been found to readily undergo an apparent self-polymerization reaction forming solids, even at room temperature, unless kept in a suitable solvent. By selecting appropriate mixed halosilanes, compositions may be formed having properties intermediate of either a purely difunctional or a purely tri or tetra functional composition. Thus, for example, ammonia or a primary amine may be reacted with a mixture of dimethyldichlorosilane and methyltrichlorosilane, in either equal or unequal molar proportions, to give a reaction product having intermediate characteristics as compared to similar compositions derived from the dimethyldichlorosilane by itself or the methyltrichlorosilane by itself. Equimolar mixtures normally will not undergo polymerization at room temperature, at least to the extent of forming a solid, but, rather, require heating to obtain appreciable polymerization.

As indicated above, the present invention is specifically concerned with coating compositions comprising the ammonolysis or aminolysis reaction products of mixtures of difunctional halosilanes with either or both tri and tetra functional halosilanes; and, further, is concerned with the addition of a particular class of modifiers or catalysts to such reaction products to improve their coating or film forming properties.

In accordance with this invention, properties of the aforementioned mixed silamine coating compositions are modified or controlled by the addition of compounds from the class which may be referred to generically as metallic salts of monocarboxylic acids. Metals which are contemplated for the metallic portion of the salts are iron, lead, zinc, manganese, calcium, zirconium, tin, cobalt and certain of the rear earths, particularly cerium. In view of the fact that the ammonolysis or aminolysis reaction products of halosilanes, as contemplated herein, are used with either aliphatic or aromatic hydrocarbon solvents in forming coating compositions, it is necessary that the metallic salts be soluble in such hydrocarbon solvents. Typical commercially available solvents which may be used are xylene and naphtha. Exemplary organic acids which impart solubility and which may be used in forming the contemplated metallic salts with the foregoing metals are naphthenic and octoic acids, as well as abietic, oleic, linoleic acid, and tall oil, with naphthenic and octoic acids being preferred for the reason that metallic salts of the latter acids, generally, have the highest solubility in hydrocarbon solvents. Salts of acids such as cited above are sometimes referred to as "soaps," although monocarboxylic acid salts which are not normally considered soaps may, in many instances, be used.

The iron or cerium salts, for example, an iron or cerium naphthenate, have been found to materially accelerate the cure or drying time of silamine compositions as contemplated herein, to the extent that it requires normally less than half the time to air-dry or bake a particular silamine composition containing an iron naphthenate as compared to the same silamine composition which does not contain the modifier. Although not appreciably affecting the drying time, the lead salts have been found to increase the hardness and improve flexibility of the cured coatings. Zinc salts have been found to modify silamine compositions in a manner somewhat similar to that of the lead salts and, in general, can be considered as advantageous for the purpose of increasing toughness without increasing brittleness of the cured or dried composition. Manganese has been found to definitely increase hardness while calcium salts, such as a calcium naphthenate or octoate considerably improve the alkaline resistance of an air-dried or baked film. Cobalt salts have been found to have utility in increasing the surface hardness of the cured silamine compositions. Zirconium salts improve the uniformity of drying while salts of tin improve solvent resistance. It will be appreciated that numerous combinations of the present modifiers can be incorporated into the silamine coating compositions with the objective of obtaining desired properties. For example, an iron naphthenate, to reduce drying time, may be used together with a lead or manganese naphthenate to increase hardness of a final film.

The final curing of silamine compositions, whether by air-drying or baking and with or without the present modifiers, is believed to involve the release of ammonia and the formation of a predominantly siloxane-type of structure, although the exact mechanism involved is not completely understood at the present time. It is suggested that the action of the present modifiers, and especially those which affect cure time, involves the catalyzation of ammonia release.

Varying amounts of the di and trifunctional or tetrafunctional ammonolysis or aminolysis reaction products of halosilanes are contemplated, the proportions of each, of course, varying depending upon the end product. Additionally, the di, tri and tetrafunctional reaction products in a silamine composition may contain the same or different hydrocarbon radicals attached to silicon, again depending on the end use of the particular composition and properties desired. In view of the various proportions of the reaction products and also the various types of reaction products which may be employed, the cure rates of the mixtures will vary considerably. Accordingly, within certain ranges, the quantities of metallic salts and the various combinations of salts will, likewise, vary. For example, the slower drying silamine compositions, usually those having appreciable quantities of difunctional reaction product will, in general, require higher amounts of the iron salts to reduce their drying time. Correspondingly, depending upon the quantity of difunctional reaction product in the mixture and the type of hydrocarbon radical attached to the silicon, varying amounts of the hardening agents, such as lead, manganese, zinc, metallic salts will be added. However, the following ranges have been found to be preferred to achieve properties herein indicated obtainable, the percentages given being the percentage of the actual metal part of the salt by weight, based on the weight of the silamine modified:

0.01%–1.00% iron  
0.01%–0.50% cerium  
0.01%–1.00% lead  
0.01%–0.50% zinc  
0.01%–0.30% manganese  
0.05%–0.50% calcium  
0.01%–1.00% cobalt  
0.02%–0.20% zirconium  
0.03%–0.50% tin As further illustrating the invention, but not otherwise intending to limit the same, the following examples are presented disclosing the addition of metallic soaps contemplated by the present invention to the ammonolysis or aminolysis reaction products of mixed di and tri or tetra functional halosilanes.

*Example 1*

To an alkyl-silamine prepared by ammonolysis from equal molar proportions of dimethyldichlorosilane and methyltrichlorosilane is added 0.03% by weight of iron in the form of iron naphthenate. The mixture is dissolved in equal parts by weight of xylene. A film on glass of this solution air-dries dust-free in fifteen minutes and tack-free in one hour. Without the drier, a film of the same compound air-dries dust-free in seventy minutes and tack-free in two and one-quarter hours. After aging four days, the film containing the iron soap had a pencil hardness of 2H, while a film formed omitting the modifier was much softer, having a pencil hardness of B.

A film of the silamine without the iron soap on a tin panel required two hours baking at 200° C. to dry, while the same composition with 0.03% iron required only one hour at 200° C. In the latter instances, the film containing the iron had a pencil hardness of 6H and without the iron, a pencil hardness of 4H.

Increasing the iron content of the same composition to 0.05% decreases air-drying time to fifty minutes.

*Example 2*

To an alkyl-silamine, prepared by ammonolysis from one mole of dimethyldichlorosilane and two moles of methyltrichlorosilane, was added 0.03% by weight of iron as iron octoate. The mixture was dissolved in equal parts by weight of xylene. Films deposited on glass, air-dried dust-free in five minutes and tack-free in thirty minutes, as compared to fifteen and ninety minutes drying time, respectively, for films of the same composition without the modifiers.

*Example 3*

To a mixed alkyl-aryl-silamine prepared by ammonolysis of one mole methyltrichlorosilane, one mole phenyltrichlorosilane and two moles dimethyldichlorosilane was added 0.03% by weight of iron as iron naphthenate and the mixture then dissolved in xylene to fifty per cent solids. The air-dry, dust-free time was decreased from thirty minutes to five minutes and the tack-free time from 6.5 hours to 2.5 hours, by the addition of the modifier. The same composition baked for one hour at 200° C. yielded a tack-free film having a pencil hardness of 7H, whereas without the iron, three hours baking was required and the final film hardness was only 4H.

*Example 4*

To the silamine, of Example 1, is added 0.2% by weight of lead as lead octoate. After baking three hours at 200° C., the resulting film was found to have a 9H pencil hardness. The coating did not break when subjected to 30 in. lbs. impact. The chemical resistance of this film is much better than that without the lead, as shown by spot tests with five per cent hydrochloric and with five per cent sodium hydroxide solutions, which left no visible marks on the coating after overnight exposure.

*Example 5*

The addition of 0.1% zinc as zinc naphthenate to the silamine of Example 1 produced a hard but flexible coating on a tin plate panel after three hours baking at 200° C. When the coated panel was bent over a one-quarter inch mandrel, no visible failure in the continuity of the coating occurred. Without the zinc, a corresponding coating cracked and lost adhesion when subjected to the latter test.

*Example 6*

To the silamine of Example 1 is added 0.1% manganese as manganese naphthenate. The air-drying time of films on glass are not affected by the addition of this drier, however, the film hardness of compositions containing the modifier increased from B to 5H pencil hardness.

*Example 7*

To an aryl-silamine prepared by the ammonolysis of equal parts of phenyltrichloro and diphenyldichloro silanes was added 0.3% iron as iron naphthenate. A film on a tin plate panel which was baked for one hour at 200° C., had a pencil hardness of 6–7H. Without the iron, the same composition required three hours baking at 200° C. to attain a hardness of H.

*Example 8*

To an alkyl-silamine, prepared by ammonolysis of a mixture of one mole silicon tetrachloride and three moles dimethyldichlorosilane, was added 0.05% cerium as 6% cerium naphthenate. A film of a fifty per cent solution of the composition in toluene air-dried dust-free in 1.5 hours and tack-free in 4.5 hours on glass. The film had a pencil hardness of 7H. Without the cerium, the composition required overnight drying and the film hardness was 4H.

*Example 9*

To an alkyl-silamine, prepared by ammonolysis from equimolar amounts of methyltrichlorosilane and dimethyldichlorosilane, is added 0.03% zirconium as 6% zirconium octoate. A coating from a fifty percent toluene solution of the composition was baked on a tin plate to a hard but not brittle film in fifteen minutes at 200° C. while two hours are required to obtain a tack-free coating without the zirconium.

*Example 10*

To a silamine prepared by ammonolysis from a mixture of one mole of methyltrichlorosilane, one mole of phenyltrichlorosilane and two moles dimethyldichlorosilane is added 0.06% tin as 8% tin octoate. A coating from a fifty percent toluene solution of this composition baked on a tin plated panel for one hour at 200° C. had considerably better resistance to solvents such as methylethylketone, trichloroethylene and toluene than the same composition without the tin catalyst.

As indicated hereinabove, the present compositions have found special utility in the production, particularly, of heat-resistant protective films, coatings, and paint vehicles. It is within the scope of this invention to add the usual pigments and similar agents where appropriate. Thus, the compositions, in addition to the metallic salts, may contain titanium dioxide, carbon black and metallic powders, such as zinc and aluminum, to give desired colors in the film or coating.

Having described certain exemplary embodiments of the invention, the same is intended to be limited only by the scope of the following claims.

I claim:

1. A composition of matter comprising the reaction product under anhydrous conditions of a member of the class consisting of ammonia and primary amine with a mixture of halosilanes having the general formula:

$$R_nSiHal_{4-n}$$
and
$$R_2SiHal_2$$

wherein R is a monovalent hydrocarbon radical and n is an integer from 0–1, said reaction product being characterized by having an $$-Si-N-Si-$$

linkage as a part of its molecular structure; and a hydrocarbon solvent soluble metallic salt of a monocarboxylic acid wherein the metallic portion of said salt is selected from the class consisting of iron, cerium, lead, zinc, manganese, calcium, zirconium, tin, and cobalt.

2. A coating composition comprising the reaction product under anhydrous conditions of a member of the class consisting of ammonia and primary amine with a mixture of chlorosilanes having the general formula:

$$RnSiCl_{4-n}$$
and
$$R_2SiCl_2$$

wherein R is a monovalent hydrocarbon radical and n is an integer from 0–1, said reaction product being characterized by having an $$-Si-N-Si-$$

linkage as a part of its molecular structure; and a hydrocarbon solvent soluble metallic salt of a monocarboxylic acid wherein the metallic portion of said salt is selected from the class consisting of iron, cerium, lead, zinc, manganese, calcium, zirconium, tin, and cobalt.

3. A coating composition as described in claim 2 wherein said metallic salt is a naphthenate.

4. A coating composition as described in claim 3 wherein R is selected from the class consisting of methyl and phenyl groups.

5. A coating composition as described in claim 2 wherein said metallic salt is an octoate.

6. A coating composition as described in claim 5 wherein R is selected from the class consisting of methyl and phenyl groups.

7. A coating composition comprising the reaction product under anhydrous conditions of a member of the class consisting of ammonia and primary amine with a mixture of chlorosilanes having the general formula:

$$RSiCl_3$$
and
$$R_2SiCl_2$$

wherein R is a monovalent hydrocarbon radical, said reaction product being characterized by having an $$-Si-N-Si-$$

linkage as a part of its molecular structure; and containing a metallic salt selected from the class consisting of an iron naphthenate and an iron octoate, wherein the iron portion of the salt comprises between about 0.01–1.00 percent by weight of said reaction product.

8. A coating composition as described in claim 7 which includes by weight at least one member of the class consisting of 0.01–1.00 percent lead, 0.01–0.50 percent zinc, 0.01–0.30 percent manganese, 0.05–0.50 percent calcium, 0.01–0.50 percent cerium, 0.02–0.20 percent zirconium, 0.03–0.50 percent tin and 0.01–1.00 percent cobalt, said metals being present as a salt from the group consisting of naphthenates and octoates.

9. A coating composition as described in claim 8 wherein R is selected from the class consisting of methyl and phenyl groups.

10. A coating composition comprising the reaction product under anhydrous conditions of a member of the class consisting of ammonia and primary amine with a mixture of chlorosilanes having the general formula:

$$SiCl_4$$

and $$R_2SiCl_2$$

wherein R is a monovalent hydrocarbon radical, said reaction product being characterized by having an $$-Si-N-Si-$$

linkage as a part of its molecular structure; and containing a metallic salt selected from the class consisting of an iron naphthenate and an iron octoate, wherein the iron portion of the salt comprises between about 0.01–1.00 percent by weight of said reaction product.

11. A coating composition comprising the reaction product under anhydrous conditions of a member of the class consisting of ammonia and primary amine with a chlorosilane mixture comprising methyltrichlorosilane and dimethyldichlorosilane, said reaction product being characterized by having an $$-Si-N-Si-$$

linkage as a part of its molecular structure; and a metallic modifier from the class consisting of 0.01–1.00 percent iron, 0.01–1.00 percent lead, 0.01–0.50 percent zinc, 0.01–0.30 percent manganese, 0.05–0.50 percent calcium, 0.01–1.00 percent cobalt, 0.01–0.50 percent cerium, 0.02–0.20 percent zirconium, 0.03–0.50 percent tin, and mixtures thereof, said metallic modifier being present as a salt from the group consisting of naphthenates and octoates.

12. A coating composition comprising the reaction product under anhydrous conditions of a member of the class consisting of ammonia and primary amine with a chlorosilane mixture comprising phenyltrichlorosilane and dimethyldichlorosilane, said reaction product being characterized by having an $$-Si-N-Si-$$

linkage as a part of its molecular structure; and a metallic modifier from the class consisting of 0.01–1.00 percent iron, 0.01–1.00 percent lead, 0.01–0.05 percent zinc, 0.01–0.30 percent manganese, 0.05–0.50 percent calcium, 0.01–1.00 percent cobalt, 0.01–0.50 percent cerium, 0.02–0.20 percent zirconium, 0.03–0.50 percent tin, and mixtures thereof, said metallic modifier being present as a salt from the group consisting of naphthenates and octoates.

13. A process of forming a resinous coating which comprises subjecting the reaction product under anhydrous conditions of a member of the class consisting of ammonia and primary amine with a mixture of halosilanes having the general formula:

$$R_nSiHal_{4-n}$$

and $$R_2SiHal_2$$

wherein R is a monovalent hydrocarbon radical and n is an integer from 0–1, said reaction product being characterized by having an $$-Si-N-Si-$$

linkage as part of its molecular structure, to the action of a hydrocarbon solvent soluble metallic salt of a monocarboxylic acid wherein the metallic portion of said salt is selected from the class consisting of iron, cerium, lead, zinc, manganese, calcium, zirconium, tin, and cobalt.

14. A process of forming a resinous coating which comprises subjecting the reaction product under anhydrous conditions of a member of the class consisting of ammonia and primary amine with a mixture of chlorosilanes having the general formula:

$$R_nSiCl_{4-n}$$

and $$R_2SiCl_2$$

wherein R is a monovalent hydrocarbon radical and n is an integer from 0–1, said reaction product being characterized by having an $$-Si-N-Si-$$

linkage as part of its molecular structure, to the action of a hydrocarbon solvent soluble metallic salt of a monocarboxylic acid wherein the metallic portion of said salt is selected from the class consisting of iron, cerium, lead, zinc, manganese, calcium, zirconium, tin, and cobalt.

15. A process as described in claim 14 wherein said metallic salt is selected from the class consisting of a naphthenate and an octoate.

References Cited in the file of this patent

UNITED STATES PATENTS

| | | |
|---|---|---|
| 2,449,572 | Welsh | Sept. 21, 1948 |
| 2,503,919 | Patnode | Apr. 11, 1950 |
| 2,579,418 | Cheronis | Dec. 18, 1951 |
| 2,635,060 | Cheronis et al. | Apr. 14, 1953 |
| 2,687,388 | McNulty et al. | Aug. 24, 1954 |
| 2,843,555 | Bearidge | July 5, 1958 |
| 2,885,370 | Groszos | May 5, 1959 |

OTHER REFERENCES

Rochow: An Intro. to the Chem. of the Silicones (2nd Ed.) 1951, pp. 74 and 75, publ. by J. Wiley & Sons, Inc., N.Y.

Chatfield: Varnish Constituents, 1953, pp. 555–571, publ. by Leonard Hill Ltd., London, England.